United States Patent
Atsuji et al.

(10) Patent No.: US 11,834,378 B2
(45) Date of Patent: Dec. 5, 2023

(54) COMPOSITE SINTERED BODY, HONEYCOMB STRUCTURE, ELECTRICALLY HEATED CATALYST, AND METHOD OF MANUFACTURING COMPOSITE SINTERED BODY

(71) Applicant: NGK INSULATORS, LTD., Nagoya (JP)

(72) Inventors: Kyohei Atsuji, Nagoya (JP); Shinji Suzuki, Nagoya (JP); Shinpei Oshima, Nagoya (JP); Takahiro Tomita, Chita (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/649,950

(22) Filed: Feb. 4, 2022

(65) Prior Publication Data

US 2022/0306539 A1   Sep. 29, 2022

(30) Foreign Application Priority Data

Mar. 25, 2021 (JP) .................... 2021-052319

(51) Int. Cl.

| | |
|---|---|
| *B01J 21/06* | (2006.01) |
| *B01J 21/12* | (2006.01) |
| *B01J 21/16* | (2006.01) |
| *B01J 35/00* | (2006.01) |
| *B01J 35/04* | (2006.01) |
| *B01J 35/10* | (2006.01) |
| *C04B 35/185* | (2006.01) |

(Continued)

(52) U.S. Cl.
CPC ............. *C04B 35/185* (2013.01); *B01J 21/06* (2013.01); *B01J 35/0026* (2013.01); *B01J 35/04* (2013.01); *B01J 35/1076* (2013.01); *C04B 35/195* (2013.01); *C04B 38/0006* (2013.01); *C04B 38/0054* (2013.01); *C04B 2235/3222* (2013.01); *C04B 2235/76* (2013.01)

(58) Field of Classification Search
CPC ... B01J 21/06; B01J 21/12; B01J 21/16; B01J 35/0026; B01J 35/04; B01J 35/1076; C04B 35/185; C04B 35/195; C04B 38/0006; C04B 38/0054; C04B 2235/76; C04B 2235/3222
See application file for complete search history.

(56) References Cited

U.S. PATENT DOCUMENTS

| | | | |
|---|---|---|---|
| 5,011,799 A * | 4/1991 | Das Chaklander ... | C04B 35/117 501/129 |
| 6,548,436 B2 * | 4/2003 | Prior, Jr. ............... | C04B 35/185 501/153 |

(Continued)

FOREIGN PATENT DOCUMENTS

| | | |
|---|---|---|
| JP | 6373781 B2 | 8/2018 |
| JP | 2020-017584 A | 1/2020 |
| JP | 2020-161413 A | 10/2020 |

*Primary Examiner* — Cam N. Nguyen
(74) *Attorney, Agent, or Firm* — BURR PATENT LAW, PLLC

(57) ABSTRACT

A composite sintered body contains a silicon phase which is a main phase, a cordierite phase, and an amorphous phase containing Si. Further, the volume resistivity thereof at a room temperature is not lower than 0.1 Ω·cm and not higher than 2.5 Ω·cm.

11 Claims, 2 Drawing Sheets

(51) Int. Cl.
*C04B 35/195* (2006.01)
*C04B 38/00* (2006.01)

(56) References Cited

U.S. PATENT DOCUMENTS

| | | | |
|---|---|---|---|
| 6,759,151 B1* | 7/2004 | Lee | C04B 41/89 |
| | | | 416/241 B |
| 7,438,739 B2* | 10/2008 | Ziebarth | B01J 23/04 |
| | | | 60/299 |
| 9,346,714 B2* | 5/2016 | Izumi | B01J 35/04 |
| 10,232,298 B2 | 3/2019 | Kikuchi et al. | |
| 10,632,409 B2* | 4/2020 | Kikuchi | B01D 46/24492 |
| 11,332,410 B2* | 5/2022 | Atsuji | C04B 38/00 |
| 2021/0323872 A1* | 10/2021 | Sarma | C04B 35/195 |
| 2022/0013260 A1 | 1/2022 | Tokuno et al. | |

* cited by examiner

COMPOSITE SINTERED BODY, HONEYCOMB STRUCTURE, ELECTRICALLY HEATED CATALYST, AND METHOD OF MANUFACTURING COMPOSITE SINTERED BODY

CROSS REFERENCE TO RELATED APPLICATION

The present application claims the benefit of priority to Japanese Patent Application No. 2021-052319 filed on Mar. 25, 2021, the content of which is incorporated herein by reference in its entirety.

TECHNICAL FIELD

The present invention relates to a composite sintered body and a method of manufacturing the same, a honeycomb structure including the composite sintered body, and an electrically heated catalyst including the honeycomb structure.

BACKGROUND ART

Conventionally, in order to perform a purification treatment of toxic substances such as HC, CO, NOx, or the like contained in exhaust gas discharged from an engine of an automobile or the like, a catalytic converter having a columnar honeycomb structure or the like which supports a catalyst has been used.

Patent Publication No. 6373781 (Document 1), for example, discloses a honeycomb structure which can be used as an exhaust gas purification filter for purifying exhaust gas and a catalyst carrier. The honeycomb structure contains 60 mass % or more of silicon phase, preferably 70 mass % or more thereof, as a main phase. The content percentage of metals other than silicon in the silicon phase and metals forming silicide is 0.3 parts by mass or lower with respect to 100 parts by mass of silicon. Further, the honeycomb structure may contain an oxide containing $SiO_2$, and the content percentage of the oxide is 1 to 30 mass %. In the honeycomb structure, reduction in the heat capacity and an increase in the thermal diffusivity are thereby ensured.

Further, in the above-described catalytic converter, the temperature of the catalyst needs to rise to an activation temperature in the purification treatment of exhaust gas, but since the temperature of the catalytic converter is low immediately after startup of the engine, or so on, there is a possibility that the exhaust gas purification performance may be reduced. Especially, in a plug-in hybrid electrical vehicle (PHEV) or a hybrid vehicle (HV), since the vehicle runs on motor only, the temperature of the catalyst easily decreases. Then, used is an electrically heated catalyst (EHC) in which a conductive catalytic converter is connected to a pair of electrodes and causes itself to generate heat by energization, to thereby preheat the catalyst.

Japanese Patent Application Laid-Open No. 2020-161413 (Document 2) discloses a technique for the honeycomb structure used in the electrically heated catalyst, in which surface bonding of silicon particles in an electrical resistance body forming the honeycomb structure is performed and a matrix containing borosilicate and cordierite is provided around the continuous body of the silicon particles. An increase in the electric resistance is thereby suppressed in the case where the honeycomb structure is exposed to a high temperature oxidation atmosphere at 1000° C. Similarly, Japanese Patent Application Laid-Open No. 2020-17584 (Document 3) also discloses using of the honeycomb structure formed of an electrical resistance body containing silicon, borosilicate, and cordierite, for the electrically heated catalyst.

SUMMARY OF INVENTION

Since the honeycomb structure disclosed in Document 1 contains metals and silicide, the thermal expansion coefficient thereof is high. In the practical example of the honeycomb structure, since the porosity ranges from 32% to 46% and the average pore diameter ranges from 5 μm to 8 μm, the volume resistivity is high and the strength is low. Further, in the honeycomb structure, since the porosity is relatively high, when the honeycomb structure is exposed to the high temperature oxidation atmosphere, silicon, the metals other than silicon, and silicide are easily oxidized and there is a possibility that the volume resistivity may be significantly increased. Therefore, it is difficult to divert the honeycomb structure to the electrically heated catalyst.

In the practical example of the honeycomb structure disclosed in Document 2, the volume resistivity before exposure to the high temperature oxidation atmosphere is high, specifically ranging from 0.027 Ω·m to 2.8 Ω·m (i.e., from 2.7 Ω·cm to 280 Ω·cm). Further, since the practical example of the honeycomb structure disclosed in Document 3 has almost the same composition as the sample 2 has in the practical example of Document 2, it is estimated that the volume resistivity is high, specifically 0.085 Ω·m (i.e., 8.5 Ω·cm).

Furthermore, in the honeycomb structure disclosed in Document 2, since a portion in which the silicon particles are continuous is a local microstructure, it is thought that variation in the volume resistivity for all portions of the honeycomb structure is large. It is thought that this local microstructure is caused by inhibiting sintering of the silicon particles by borosilicate. Further, since the honeycomb structure contains borosilicate, sintering shrinkage becomes large and it is difficult to form the honeycomb structure with high dimensional accuracy.

The present invention is intended for a composite sintered body, and it is an object of the present invention to provide a composite sintered body having low resistance and high oxidation resistance.

The composite sintered body according to one preferred embodiment of the present invention contains a silicon phase which is a main phase, a cordierite phase, and an amorphous phase containing Si. The volume resistivity of the composite sintered body at a room temperature is not lower than 0.1 Ω·cm and not higher than 2.5 Ω·cm.

According to the present invention, it is possible to provide a composite sintered body having low resistance and high oxidation resistance.

Preferably, $I_1/(I_1+I_2)$ is not smaller than 0.80 and not larger than 0.97. In the above formula, $I_1$ and $I_2$ represent peak intensities of a (111) plane of silicon and a (110) plane of cordierite, respectively, which are obtained by the X-ray diffraction method.

Preferably, the composite sintered body further contains a mullite phase.

Preferably, $I_3/(I_1+I_2+I_3)$ should be not smaller than 0.001 and not larger than 0.006. In the above formula, $I_1$, $I_2$, and $I_3$ represent peak intensities of a (111) plane of silicon, a (110) plane of cordierite, and a (120) plane of mullite, respectively, which are obtained by the X-ray diffraction method, $I_3/(I_1+I_2+I_3)$ is not smaller than 0.001 and not larger than 0.006.

Preferably, the porosity is not lower than 15% and not higher than 40%.

Preferably, the pore diameter is not smaller than 1.0 μm and not larger than 3.5 μm.

Preferably, the bulk density is not lower than 1.4 g/cm$^3$ and not higher than 2.2 g/cm$^3$.

Preferably, the change rate of the volume resistivity after exposing the composite sintered body to an atmosphere at 950° C. for 50 hours is not higher than 100%.

The present invention is also intended for a honeycomb structure. The honeycomb structure according to one preferred embodiment of the present invention includes a cylindrical outer wall and a partition wall partitioning the inside of the cylindrical outer wall into a plurality of cells. The cylindrical outer wall and the partition wall are formed, including the above-described composite sintered body.

The present invention is still also intended for an electrically heated catalyst used for performing a purification treatment of exhaust gas discharged from an engine. The electrically heated catalyst according to one preferred embodiment of the present invention includes the above-described honeycomb structure and a pair of electrode parts fixed to an outer surface of the honeycomb structure, for giving a current to the honeycomb structure.

The present invention is yet also intended for a method of manufacturing a composite sintered body. The method of manufacturing a composite sintered body according to one preferred embodiment of the present invention includes obtaining a sintered body by molding and sintering raw material powder containing a silicon raw material and a cordierite raw material and obtaining a composite sintered body by performing an oxidation treatment on the sintered body. The composite sintered body contains a silicon phase which is a main phase, a cordierite phase, and an amorphous phase containing Si. The volume resistivity of the composite sintered body at a room temperature is not lower than 0.1 Ω·cm and not higher than 2.5 Ω·cm.

Preferably, when $d_1$ and $d_2$ represent particle diameters of the silicon raw material and the cordierite raw material, respectively, $d_1/d_2$ is not smaller than 0.25 and not larger than 1.25.

These and other objects, features, aspects and advantages of the present invention will become more apparent from the following detailed description of the present invention when taken in conjunction with the accompanying drawings.

DESCRIPTION OF EMBODIMENTS

Figure 1:
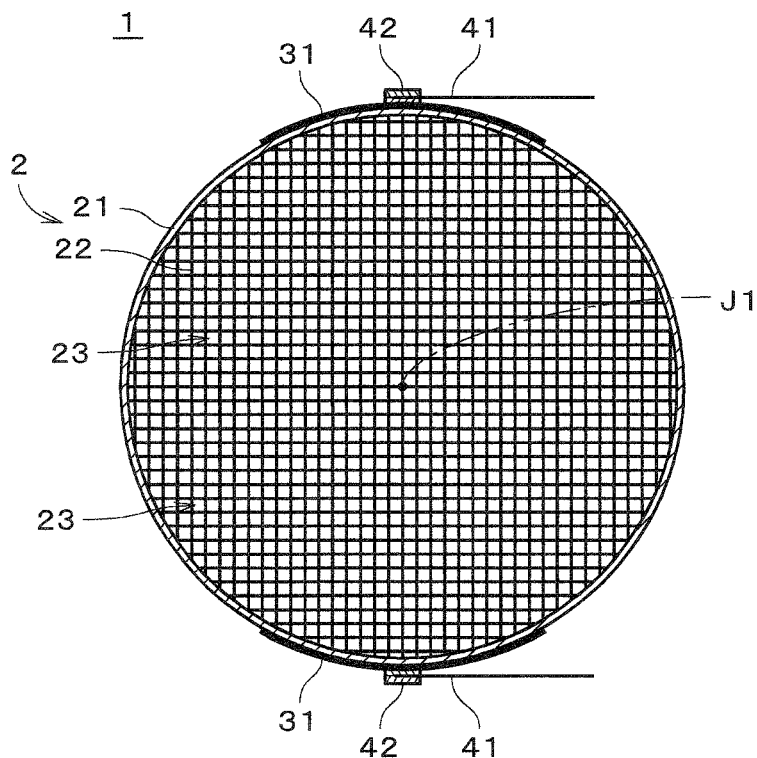
FIG. 1 is a cross section showing an electrically heated catalyst in accordance with one preferred embodiment.

FIG. 1 is a cross section showing an electrically heated catalyst (EHC) 1 in accordance with one preferred embodiment of the present invention. The electrically heated catalyst 1 is a columnar member which is long in one direction, and FIG. 1 shows a cross section perpendicular to a longitudinal direction of the electrically heated catalyst 1. The electrically heated catalyst 1 is used to perform a purification treatment of exhaust gas discharged from an engine of an automobile or the like.

The electrically heated catalyst 1 includes a honeycomb structure 2, a pair of electrode layers 31, and a pair of electrode parts 41. The honeycomb structure 2, the pair of electrode layers 31, and the pair of electrode parts 41 are each conductive. The honeycomb structure 2 is a substantially columnar member having a honeycomb construction, and is a carrier supporting a catalyst in the electrically heated catalyst 1. The pair of electrode layers 31 are fixed on an outer surface of the honeycomb structure 2. The pair of electrode layers 31 are foil-like or plate-like members which are arranged, facing each other with a central axis J1 sandwiched therebetween. The central axis J1 extends in a longitudinal direction of the honeycomb structure 2. Each of the electrode layers 31 is provided along the outer surface of the honeycomb structure 2.

The pair of electrode parts 41 are fixed on a surface of the pair of electrode layers 31 by using a junction part 42. In other words, the pair of electrode parts 41 are indirectly fixed on the outer surface of the honeycomb structure 2 with the pair of electrode layers 31 interposed therebetween. The electrode part 41 is, for example, a substantially strip-like member. The electrode part 41 is part of an electrode terminal for supplying electric power to the honeycomb structure 2. The electrode part 41 is connected to a not-shown power supply. When the power supply applies a voltage across the pair of electrode layers 31 through the electrode part 41, a current flows in the honeycomb structure 2 and the honeycomb structure 2 generates heat by the Joule heat. The catalyst supported by the honeycomb structure 2 is thereby preheated. The voltage applied to the electrically heated catalyst 1 ranges, for example, from 12 V to 900 V, and preferably ranges from 64 V to 600 V. Further, the voltage may be changed as appropriate.

The honeycomb structure 2 is a cell structure which is partitioned into a plurality of cells 23 inside. The honeycomb structure 2 includes a cylindrical outer wall 21 and a partition wall 22. The cylindrical outer wall 21 is a cylindrical portion extending in the longitudinal direction (i.e., the direction perpendicular to this paper of FIG. 1). A cross-sectional shape of the cylindrical outer wall 21 which is perpendicular to the longitudinal direction is substantially circular. The cross-sectional shape may be any other shape such as an elliptical shape, a polygonal shape, or the like.

The partition wall 22 is provided inside the cylindrical outer wall 21 and is a lattice member partitioning the inside thereof into the plurality of cells 23. Each of the plurality of cells 23 is a space extending over substantially the full length of the honeycomb structure 2 in the longitudinal direction. Each cell 23 is a flow passage in which the exhaust gas flows, and the catalyst used for the purification treatment of the exhaust gas is supported by the partition wall 22. A cross-sectional shape of each cell 23 which is perpendicular to the longitudinal direction is, for example, a substantial rectangle. The cross-sectional shape may be any other shape such as a polygonal shape, a circular shape, or the like. In terms of reduction in the pressure loss in the flow of the exhaust gas in the cell 23, it is preferable that the cross-sectional shape should be a quadrangle or a hexagon. Further, in terms of an increase in the structural strength and the uniformity of heating in the honeycomb structure 2, it is preferable that the cross-sectional shape should be a rectangle. The plurality of cells 23 have the same cross-sectional shape in principle. The plurality of cells 23 may include some cells 23 each having a different cross-sectional shape.

The length of the cylindrical outer wall 21 in the longitudinal direction is, for example, 30 mm to 200 mm. The outer diameter of the cylindrical outer wall 21 is, for example, 25 mm to 120 mm. In terms of an increase in the heat resistance of the honeycomb structure 2, the area of a bottom surface of the honeycomb structure 2 (i.e., the area of a region surrounded by the cylindrical outer wall 21 in the bottom surface of the honeycomb structure 2) is preferably 2000 mm$^2$ to 20000 mm$^2$, and further preferably 5000 mm$^2$ to 15000 mm$^2$. In terms of prevention of outflow of a fluid flowing in the cell 23, an increase in the strength of the honeycomb structure 2, and the strength balance between the cylindrical outer wall 21 and the partition wall 22, the thickness of the cylindrical outer wall 21 is, for example, 0.1 mm to 1.0 mm, preferably 0.15 mm to 0.7 mm, and more preferably 0.2 mm to 0.5 mm.

The length of the partition wall 22 in the longitudinal direction is substantially the same as that of the cylindrical outer wall 21. In terms of an increase in the strength of the honeycomb structure 2 and reduction in the pressure loss in the flow of the exhaust gas in the cell 23, the thickness of the partition wall 22 is, for example, 0.1 mm to 0.3 mm and preferably 0.15 mm to 0.25 mm.

In terms of an increase in the area of the partition wall 22 which supports the catalyst and reduction in the pressure loss in the flow of the exhaust gas in the cell 23, the cell density of the honeycomb structure 2 (i.e., the number of cells 23 per unit area in the cross section perpendicular to the longitudinal direction) is, for example, 40 cells/cm$^2$ to 150 cells/cm$^2$, and preferably 70 cells/cm$^2$ to 100 cells/cm$^2$. The cell density can be obtained by dividing the number of all cells in the honeycomb structure 2 by the area of a region inside an inner peripheral edge of the cylindrical outer wall 21 in the bottom surface of the honeycomb structure 2. The size of the cell 23, the number of cells 23, the cell density, and the like may be changed in various manners.

The cylindrical outer wall 21 and the partition wall 22 in the honeycomb structure 2 are formed, including the composite sintered body described below. In the present preferred embodiment, the cylindrical outer wall 21 and the partition wall 22 are formed of substantially only the composite sintered body.

The composite sintered body is porous ceramics containing a silicon phase, a cordierite phase, and an amorphous phase. The silicon phase is a main phase of the composite sintered body and contains a plurality of silicon particles serving as an aggregate of the composite sintered body. In the composite sintered body, the plurality of silicon particles become continuous, to thereby form a conductive path. In the present specification, the "silicon phase" refers to a crystal phase formed mainly of silicon, and may contain impurities other than silicon (for example, a metal other than silicon). The content percentage of impurities is not higher than 1 part by mass with respect to 100 parts by mass of silicon. Further, "silicon" refers to a (simple) substance formed of Si element.

The cordierite phase exists among a plurality of silicon particles of the silicon phase and is a binder (i.e., a matrix) for binding the plurality of silicon particles. In the composite sintered body, it is preferable that the plurality of silicon particles should be so bound by the cordierite phase as to form a pore among the silicon particles. In the composite sintered body, since the cordierite phase having a relatively low thermal expansion coefficient is contained, the thermal shock resistance of the composite sintered body is increased. In the present specification, the "cordierite phase" refers to a crystal phase formed mainly of cordierite, and may contain impurities other than cordierite. As the impurity, for example, used is indialite which is a polymorph (also referred to as "polymorphism") of cordierite.

The amorphous phase is a phase of amorphous substance containing Si, and in the present preferred embodiment, the amorphous phase is an oxide phase formed mainly of amorphous silica (i.e., amorphous silicon dioxide ($SiO_2$)). The amorphous phase exists mainly on surfaces of the silicon particles of the silicon phase and partially or entirely coats the silicon particles. Even in a case where the composite sintered body is exposed to a high temperature oxidation atmosphere, oxidation of the silicon particles is thereby suppressed and a change in the volume resistivity of the composite sintered body is suppressed. In other words, the oxidation resistance of the composite sintered body is increased. Amorphous silica contained in the amorphous phase is generated by, for example, oxidizing the surfaces of the silicon particles of the silicon phase. Further, the amorphous phase may contain an oxide other than amorphous silica and/or any amorphous substance other than an oxide.

The composite sintered body may further contain a cristobalite phase. In the present specification, the "cristobalite phase" refers to a crystal phase formed mainly of cristobalite, and may contain impurities other than cristobalite. The cristobalite phase exists, for example, on the surfaces of the silicon particles of the silicon phase, a surface and an inside of a film of the amorphous phase coating the silicon particles, and the like. The cristobalite phase is generated by, for example, oxidizing the surfaces of the silicon particles of the silicon phase.

The composite sintered body may further contain a mullite phase. In the present specification, the "mullite phase" refers to a crystal phase formed mainly of mullite, and may contain impurities other than mullite. The mullite phase exists, for example, on the surfaces of the silicon particles of the silicon phase, the surface and the inside of the film of the amorphous phase coating the silicon particles, and the like. The mullite phase is generated by, for example, reaction sintering or the like using and consuming cristobalite as a material, which is generated by oxidizing the surfaces of the silicon particles. The denseness of the composite sintered body is thereby increased, and the oxidation resistance and the strength of the composite sintered body are increased. Further, since the thermal expansion coefficient of the composite sintered body is reduced by reduction of the cristobalite phase, the thermal shock resistance of the composite sintered body is also increased.

The respective content percentages of the silicon phase, the cordierite phase, and the mullite phase can be determined by using the respective peak intensities of silicon, cordierite, and mullite, which are obtained by the X-ray diffraction method (XRD). In the following description, $I_1$, $I_2$, and $I_3$ represent the peak intensities of a (111) plane of silicon, a (110) plane of cordierite, and a (120) plane of mullite, respectively.

"$I_1/(I_1+I_2)$" representing the peak ratio between silicon and cordierite is preferably not smaller than 0.80 and not larger than 0.97. When $I_1/(I_1+I_2)$ is made not smaller than 0.80, excessive reduction in the content percentage of the silicon phase which forms a conductive path is suppressed, and the volume resistivity of the composite sintered body is reduced. Further, the oxidation resistance of the composite sintered body is increased, and even in the case where the composite sintered body is exposed to the high temperature oxidation atmosphere, a change in the volume resistivity of the composite sintered body is suppressed. When $I_1/(I_1+I_2)$ is made not larger than 0.97, since excessive reduction in the content percentage of the cordierite phase having a low thermal expansion coefficient is suppressed and the thermal expansion coefficient of the composite sintered body is reduced, the thermal shock resistance of the composite sintered body is increased. It is more preferable that $I_1/(I_1+I_2)$ should be made not smaller than 0.85. Further, it is more preferable that $I_1/(I_1+I_2)$ should be made not larger than 0.95.

"$I_3/(I_1+I_2+I_3)$" representing the peak ratio among mullite, silicon, and cordierite is preferably not smaller than 0.001 and not larger than 0.006. When $I_3/(I_1+I_2+I_3)$ is made not smaller than 0.001, the oxidation resistance, the strength, and the thermal shock resistance of the composite sintered body is suitably increased. Further, when $I_3/(I_1+I_2+I_3)$ is made not larger than 0.006, an increase in the volume resistivity is suppressed. It is more preferable that $I_3/(I_1+I_2+I_3)$ should be not smaller than 0.002. Further, it is more preferable that $I_3/(I_1+I_2+I_3)$ should be not larger than 0.003.

The volume resistivity of the composite sintered body at a room temperature is not lower than 0.1 Ω·cm and not higher than 2.5 Ω·cm. In the present specification, the "room temperature" indicates 20° C., and the "volume resistivity" refers to volume resistivity at the room temperature, unless otherwise specified. When the volume resistivity of the composite sintered body is made not higher than 2.5 Ω·cm, the electrical conductivity of the electrically heated catalyst 1 is increased and a quick rise of the temperature of the electrically heated catalyst 1 is achieved. Further, when the volume resistivity of the composite sintered body is made not lower than 0.1 Ω·cm, even in a case where a relatively high voltage is applied to the composite sintered body, damage of an electric circuit due to excessive current flow is prevented. The volume resistivity of the composite sintered body is preferably not higher than 1.0 Ω·cm. Further, the volume resistivity of the composite sintered body is preferably not lower than 0.15·cm. The volume resistivity thereof can be measured by the four-terminal method (JIS C2525). The cross-sectional area in the case where the volume resistivity of the honeycomb structure is measured is corrected by using the aperture ratio.

The change rate of the volume resistivity (hereinafter, also referred to as a "resistance change rate") after exposing the composite sintered body to an atmosphere at 950° C., which is a high temperature oxidation atmosphere, for 50 hours is preferably not higher than 100%. The change rate is a result expressed by percentage, which is obtained by subtracting 1 from a value obtained by dividing the volume resistivity of the composite sintered body after exposing thereof to an atmosphere at 950° C. for 50 hours by the volume resistivity (hereinafter, also referred to as "initial resistivity") of the composite sintered body before the exposure. In the present specification, the "resistance change rate" refers to the change rate of the volume resistivity of the composite sintered body after exposing thereof to the atmosphere at 950° C. for 50 hours, unless otherwise specified.

When the resistance change rate of the composite sintered body is made not higher than 100%, even in the case where the composite sintered body is exposed to the high temperature oxidation atmosphere, the change in the volume resistivity of the composite sintered body is suitably suppressed. Various performances such as the energization performance and the like of the electrically heated catalyst 1 can be thereby kept within a desirable range. The resistance change rate of the composite sintered body is preferably not higher than 50%, more preferably not higher than 25%, and further preferably not higher than 5%. Further, there is a possibility that the volume resistivity of the composite sintered body may be reduced by the effects of the impurities contained in the silicon phase and the cordierite phase, and the like. In this case, the resistance change rate is preferably not lower than −50%, and more preferably not lower than −25%. Since it is desirable that the volume resistivity of the composite sintered body should not be changed, it is desirable that the resistance change rate should be closer to 0%.

It is preferable that the porosity of the composite sintered body should be not lower than 15% and not higher than 40%. When the porosity is made not lower than 15%, the Young's modulus of the composite sintered body is reduced and the thermal shock resistance thereof is increased. Further, when the porosity is made not higher than 40%, the denseness of the composite sintered body is increased. As a result, the volume resistivity of the composite sintered body is reduced and the oxidation resistance and the strength thereof is increased. The porosity can be measured, for example, by the mercury press-in method (JIS R1655) using a mercury porosimeter or the like. It is preferable that the porosity of the composite sintered body should be not lower than 17%. Further, it is preferable that the porosity of the composite sintered body should be not higher than 30%.

It is preferable that the pore diameter of the composite sintered body should be not smaller than 1.0 μm and not larger than 3.5 μm. The denseness of the composite sintered body is thereby secured. As a result, the volume resistivity of the composite sintered body is reduced and the oxidation resistance and the strength thereof are increased. In the present specification, the "pore diameter" refers to the average pore diameter of the composite sintered body. The pore diameter can be measured, for example, by the mercury press-in method (JIS R1655) using the mercury porosimeter or the like. It is more preferable that the pore diameter of the composite sintered body should be not smaller than 1.5 μm. Further, it is more preferable that the pore diameter of the composite sintered body should be not larger than 3.0 μm.

It is preferable that the bulk density should be not lower than 1.4 g/cm$^3$ and not higher than 2.2 g/cm$^3$. When the bulk density is made not lower than 1.4 g/cm$^3$, the volume resistivity of the composite sintered body is reduced and the oxidation resistance and the strength thereof are increased. Further, when the bulk density is made not higher than 2.2 g/cm$^3$, the heat capacity of the composite sintered body is reduced and the temperature becomes easier to rise. The bulk density can be measured, for example, by the mercury press-in method (JIS R1655) using the mercury porosimeter or the like. It is more preferable that the bulk density should be not lower than 1.7 g/cm$^3$. Further, it is more preferable that the bulk density of the composite sintered body should be not higher than 2.0 g/cm$^3$.

The electrode layer 31 extends in the longitudinal direction along the outer surface of the honeycomb structure 2 and spreads in a circumferential direction around the central axis J1 (hereinafter, also referred to simply as a "circumferential direction"). The electrode layer 31 spreads the current from the electrode part 41 in the longitudinal direction and the circumferential direction, to thereby increase the uniformity of heat generation of the honeycomb structure 2. The length of the electrode layer 31 in the longitudinal direction is, for example, 80% or more of the length of the honeycomb structure 2 in the longitudinal direction, and preferably 90% or more. More preferably, the electrode layer 31 extends over the full length of the honeycomb structure 2.

The angle of the electrode layer 31 in the circumferential direction (i.e., an angle formed by two line segments extending from both ends of the electrode layer 31 in the circumferential direction to the central axis 1) is, for example, not smaller than 30°, preferably not smaller than 40°, and more preferably not smaller than 60°. On the other hand, in terms of suppressing the current flowing inside the honeycomb structure 2 from decreasing due to the pair of electrode layers 31 which are too close to each other, the angle of the electrode layer 31 in the circumferential direction is, for example, not larger than 140°, preferably not larger than 130°, and more preferably not larger than 120°.

In the exemplary case shown in FIG. 1, though the angle between centers of the pair of electrode layers 31 in the circumferential direction (i.e., the angle not larger than 180°, which is formed by two line segments extending from the respective centers of the two electrode layers 31 in the circumferential direction to the central axis J1 in FIG. 1) is 180°, this angle may be changed as appropriate. The angle is, for example, not smaller than 150°. preferably not smaller than 160°, and more preferably not smaller than 170°.

In terms of preventing the electric resistance from becoming excessively high and preventing any breakage in a case where the honeycomb structure 2 is put into a container (i.e., in canning), the thickness of the electrode layer 31 (i.e., the thickness in the radial direction) is, for example, 0.01 mm to 5 mm, and preferably 0.01 mm to 3 mm.

It is preferable that the volume resistivity of the electrode layer 31 should be lower than that of the honeycomb structure 2. The current thereby becomes easier to flow to the electrode layer 31 than to the honeycomb structure 2, and the current becomes easier to be spread in the longitudinal direction and the circumferential direction of the honeycomb structure 2.

The electrode layer 31 is formed of, for example, conductive ceramics, a metal, or a composite material of the conductive ceramics and the metal. The conductive ceramics is, for example, silicon carbide (SiC) or a metal silicide such as tantalum silicide ($TaSi_2$), chromium silicide ($CrSi_2$), or the like. The metal is, for example, chromium (Cr), iron (Fe), cobalt (Co), nickel (N), Si, or titanium (Ti). In terms of reduction in the thermal expansion coefficient, the material of the electrode layer 31 may be a composite material in which alumina, mullite, zirconia, cordierite, silicon nitride, aluminum nitride, or the like is added to one kind of or two or more kinds of metals.

It is preferable that the material of the electrode layer 31 should be a material which can be sintered (fired) at the same time as the honeycomb structure 2 is sintered. In terms of compatibility between the heat resistance and the conductivity, the material of the electrode layer 31 is preferably ceramics whose main component (specifically, containing 90 mass % or more) is SiC or a silicon-silicon carbide (Si—SiC) composite material, and more preferably SiC or a Si—SiC composite material. The Si—SiC composite material contains SiC particles as an aggregate and Si as a binder for binding the SiC particles, and it is preferable that a plurality of SiC particles should be so bound by Si as to form a pore among the SiC particles.

The electrode part 41 is formed of, for example, a simple metal or an alloy. In terms of having high corrosion resistance and appropriate volume resistivity and thermal expansion coefficient, the material of the electrode part 41 is preferably an alloy containing at least one kind of Cr, Fe, Co, Ni, Ti, and aluminum (Al). The electrode part 41 is preferably stainless steel and more preferably contains Al. Further, the electrode part 41 may be formed of a metal-ceramics mixed member. The metal contained in the metal-ceramics mixed member is, for example, a simple metal such as Cr, Fe, Co, Ni, Si, or Ti or an alloy containing at least one kind of metal selected from a group of these metals. The ceramics contained in the metal-ceramics mixed member is, for example, silicon carbide (SiC) or a metal compound such as metal silicide (e.g., tantalum silicide ($TaSi_2$) or chromium silicide ($CrSi_2$)) or the like. As the ceramics, cermet (i.e., a composite material of ceramics and a metal) may be used. The cermet is, for example, a composite material of metallic silicon and silicon carbide, a composite material of metal silicide, metallic silicon, and silicon carbide, or a composite material in which one or more kinds of insulating ceramics such as alumina, mullite, zirconia, cordierite, silicon nitride, aluminum nitride, or the like are added to one or more kinds of the above-described metals.

Each of the junction parts 42 is formed of, for example, a composite material containing a metal and an oxide. The metal is, for example, one or more kinds of stainless steel, a Ni—Fe alloy, and Si. The oxide is one or more kinds of cordierite-based glass, silicon dioxide ($SiO_2$), aluminum oxide ($Al_2O_3$), magnesium oxide (MgO), and a composite oxide of these oxides.

The junction part 42 may contain a conductive material other than any metal, instead of the above-described metal or additionally to the above-described metal. The conductive material is, for example, one or more kinds of a boride such as zinc boride, tantalum boride, or the like, a nitride such as titanium nitride, zirconium nitride, or the like, and a carbide such as silicon carbide, tungsten carbide, or the like.

Figure 2:
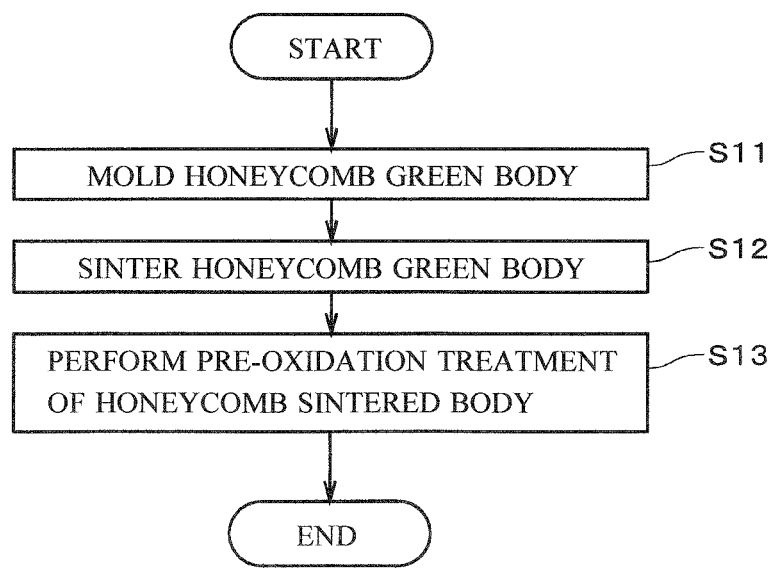
FIG. 2 is a flowchart showing an operation flow for manufacturing a honeycomb structure.

Next, with reference to FIG. 2, an exemplary flow of manufacturing the honeycomb structure 2 will be described. First, raw material powder containing a silicon raw material and a cordierite raw material (i.e., raw material powder of the silicon phase and the cordierite phase), a binder, a pore-forming material, and the like are weighed to have a predetermined composition and dry-mixed by using a dry mixer, to thereby obtain mixed powder. Further, in a case where a sintered body is compounded with cordierite, the raw material powder may contain a raw material (for example, one or more kinds of substances selected from kaolin, talc, alumina, silica, magnesia, forsterite, enstatite, and the like) to be used to generate cordierite by a reaction in a sintering process, instead of cordierite itself. Further, the mixing of the raw material powder, the binder, and the like may be performed by wet mixing using a solvent (for example, ion exchange water, an organic solvent, or the like).

To the above-described mixed powder, an aid may be added, additionally to the silicon raw material and cordierite raw material which are main raw materials. The aid is used in, for example, the above-described generation of the mullite phase from the cristobalite phase. The aid is, for example, a silica-alumina-based aid. As the aid, for example, a mixture of aluminum hydroxide ($Al(OH)_3$), montmorillonite, and kaolin can be used.

Further, it is preferable that the above-described mixed powder should not contain boron (B). In the manufacture of the composite sintered body, sintering inhibition among the silicon particles due to borosilicate is thereby prevented and variation in the volume resistivity for all portions of the honeycomb structure 2 is suppressed. Furthermore, since sintering shrinkage in the manufacture of the honeycomb structure 2 is reduced, the dimensional accuracy of the honeycomb structure 2 is increased.

Subsequently, the above-described mixed powder, an appropriate amount of water, and the like are kneaded by a kneader, and body paste is produced from the kneaded product which is thereby obtained, by a kneading machine. Then, by extrusion-molding the body paste, a green body having a honeycomb construction (hereinafter, also referred to as a "honeycomb green body") is manufactured. (Step S11). Next, microwave drying is performed on the honeycomb green body and then hot-air drying is performed thereon at 100° C. Further, degreasing is performed on the honeycomb green body after the drying, at 450° C. in an air atmosphere.

The honeycomb green body after the degreasing is sintered at 1375° C. for 0.5 to 10 hours in an inert gas atmosphere such as an argon (Ar) atmosphere or the like. A sintered body having a honeycomb construction (hereinafter, also referred to as a "honeycomb sintered body") is thereby manufactured. (Step S12).

After that, by performing an oxidation treatment of the honeycomb sintered body, the above-described honeycomb structure 2 is manufactured (Step S13). The oxidation treatment in Step S13 is a preliminary oxidation treatment which is performed before exposing the honeycomb structure 2 to an oxidation atmosphere at the time of use, and is hereinafter also referred to as a "pre-oxidation treatment". The pre-oxidation treatment is performed by, for example, heating the honeycomb sintered body at 1250° C. for 5 to 10 hours in the air atmosphere. The pre-oxidation treatment is also referred to as "oxidation aging". By performing the pre-oxidation treatment on the honeycomb sintered body, amorphous silica is generated on the surfaces of the silicon particles of the silicon phase and the surfaces of the silicon particles are coated by amorphous silica (i.e., the amorphous phase). Further, the temperature, the time, the atmosphere, and the like in the pre-oxidation treatment may be changed in various manners. Furthermore, the temperature, the time, the atmosphere, and the like in the above-described drying, degreasing, and sintering of the honeycomb green body may be also changed in various manners.

In the manufacture of the honeycomb structure 2, it is preferable that the ratio of the particle diameter of the silicon raw material to that of the cordierite raw material should be included within a predetermined range. Specifically, when $d_1$ and $d_2$ represent median diameters (D50) of silicon raw material powder and cordierite raw material powder, respectively, it is preferable that the particle diameter ratio $d_1/d_2$ should be not smaller than 0.25 and not larger than 1.25. When the particle diameter ratio $d_1/d_2$ is made not smaller than 0.25, in the sintering of the honeycomb green body, it is suppressed that the cordierite particles become excessively larger than the silicon particles and block the conductive path. Further, when the particle diameter ratio $d_1/d_2$ is made not larger than 1.25, in the sintering of the honeycomb green body, it is suppressed that sintering of cordierite is performed in advance and inhibits the sintering of silicon. Therefore, the uniformity of distribution of silicon sintered particles is increased. As a result, the denseness of the honeycomb structure 2 is increased and the volume resistivity thereof is reduced.

The electrically heated catalyst 1 is manufactured by fixing the pair of electrode layers 31 and the pair of electrode parts 41 to the honeycomb structure 2 which is manufactured as described above. In the electrically heated catalyst 1, the catalyst is supported by inner surfaces of the plurality of cells 23 (i.e., a side surface of the partition wall 22) of the honeycomb structure 2. Further, the pair of electrode layers 31 may be formed at the same time as the honeycomb structure 2 is formed, by giving electrode layer paste which is a raw material of the electrode layer 31 to the honeycomb green body which is a precursor of the honeycomb structure 2 and sintering both the honeycomb green body and the electrode layer paste.

Next, with reference to Tables 1 to 3, Examples of the honeycomb structure 2 in accordance with the present invention and Comparative Example for comparison with the honeycomb structure 2 will be described. Table 1 shows respective manufacturing conditions of the honeycomb structure 2 in Examples and the honeycomb structure in Comparative Example, and Tables 2 and 3 show respective compositions and characteristics of the honeycomb structure 2 in Examples and the honeycomb structure in Comparative Example.

TABLE 1

| | Manufacturing Conditions | | | | | |
|---|---|---|---|---|---|---|
| | Main Raw Material Composition | | | | | Aid Composition |
| | Silicon | | Cordierite | | | Mullite |
| | Particle Diameter (μm) | Mass % | Particle Diameter (μm) | Mass % | $d_1/d_2$ | Oxide Parts By Mass |
| Example 1 | 2.0 | 80.0 | 8.0 | 20.0 | 0.25 | — |
| Example 2 | 2.0 | 65.0 | 8.0 | 35.0 | 0.25 | — |
| Example 3 | 2.0 | 50.0 | 8.0 | 50.0 | 0.25 | — |
| Comparative Example 1 | 2.0 | 40.0 | 8.0 | 60.0 | 0.25 | — |
| Example 4 | 6.0 | 65.0 | 8.0 | 35.0 | 0.75 | — |
| Example 5 | 10 | 65.0 | 8.0 | 35.0 | 1.25 | — |
| Example 6 | 2.0 | 65.0 | 15 | 35.0 | 0.13 | — |
| Example 7 | 2.0 | 65.0 | 20 | 35.0 | 0.10 | — |
| Example 8 | 2.0 | 65.0 | 30 | 35.0 | 0.07 | — |
| Example 9 | 2.0 | 65.0 | 8.0 | 35.0 | 0.25 | 3 |
| Example 10 | 2.0 | 65.0 | 8.0 | 35.0 | 0.25 | 6 |
| Example 11 | 2.0 | 65.0 | 8.0 | 35.0 | 0.25 | 12 |

TABLE 2

| | Sintered Body Characteristics | | |
|---|---|---|---|
| | Constituent Phase | $I_1/(I_1 + I_2)$ | $I_3/(I_1 + I_2 + I_3)$ |
| Example 1 | Silicon, Cordierite, Cristobalite, Amorphous Silica | 0.95 | — |
| Example 2 | Silicon, Cordierite, Cristobalite, Amorphous Silica | 0.91 | — |
| Example 3 | Silicon, Cordierite, Cristobalite, Amorphous Silica | 0.84 | — |
| Comparative Example 1 | Silicon, Cordierite, Cristobalite, Amorphous Silica | 0.77 | — |
| Example 4 | Silicon, Cordierite, Cristobalite, Amorphous Silica | 0.93 | — |
| Example 5 | Silicon, Cordierite, Cristobalite, Amorphous Silica | 0.92 | — |
| Example 6 | Silicon, Cordierite, Cristobalite, Amorphous Silica | 0.89 | — |
| Example 7 | Silicon, Cordierite, Cristobalite, Amorphous Silica | 0.89 | — |
| Example 8 | Silicon, Cordierite, Cristobalite, Amorphous Silica | 0.90 | — |
| Example 9 | Silicon, Cordierite, Mullite, Cristobalite, Amorphous Silica | 0.90 | 0.0011 |

TABLE 2-continued

| | Sintered Body Characteristics | | |
|---|---|---|---|
| | Constituent Phase | $I_1/(I_1 + I_2)$ | $I_3/(I_1 + I_2 + I_3)$ |
| Example 10 | Silicon, Cordierite, Mullite, Cristobalite, Amorphous Silica | 0.90 | 0.0023 |
| Example 11 | Silicon, Cordierite, Mullite, Cristobalite, Amorphous Silica | 0.89 | 0.0053 |

TABLE 3

| | Sintered Body Characteristics | | | | |
|---|---|---|---|---|---|
| | Porosity (%) | Pore Diameter (μm) | Bulk Density (g/cm³) | Initial Resistivity (Ω·cm) | Resistance Change Rate (%) |
| Example 1 | 20.8 | 3.4 | 1.87 | 0.15 | 20 |
| Example 2 | 22.4 | 2.6 | 1.85 | 0.18 | 24 |
| Example 3 | 24.3 | 1.9 | 1.83 | 0.35 | 40 |
| Comparative Example 1 | 25.4 | 1.7 | 1.81 | 2.80 | 51 |
| Example 4 | 38.4 | 2.2 | 1.47 | 0.34 | 39 |
| Example 5 | 39.8 | 2.6 | 1.44 | 1.03 | 63 |
| Example 6 | 24.0 | 2.9 | 1.80 | 0.58 | 30 |
| Example 7 | 25.1 | 3.0 | 1.78 | 0.65 | 34 |
| Example 8 | 26.0 | 3.1 | 1.76 | 0.86 | 38 |
| Example 9 | 18.7 | 1.9 | 1.92 | 0.15 | 2.7 |
| Example 10 | 17.6 | 1.7 | 1.97 | 0.15 | 2.3 |
| Example 11 | 15.3 | 1.2 | 2.06 | 0.14 | 2.1 |

As shown in Table 1, in Examples 1 to 11 and Comparative Example 1, as to the silicon raw material and the cordierite raw material, the median diameter (D50) (hereinafter, also referred to simply as the "particle diameter"), the composition, and whether an aid is used or not and the composition of the aid are changed.

In Examples 1 to 11, the honeycomb structure 2 is manufactured by the above-described Steps S11 to S13. The same applies to the honeycomb structure in Comparative Example 1. As described above, the mixing of the raw material powder is performed by using the dry mixer. The temperature, the time, the atmosphere, and the like in the drying, degreasing, and sintering of the honeycomb green body and the temperature, the time, the atmosphere, and the like in the pre-oxidation treatment are not changed from those shown above.

The crystal phase among the constituent phases shown in Table 2 is identified by measuring a polished surface of a specimen cut out from the partition wall 22 of the honeycomb structure 2 by using an X-ray diffraction apparatus. As the X-ray diffraction apparatus, used is a sealed-tube X-ray diffraction apparatus (D8-ADVANCE manufactured by Bruker AXS). The measurement conditions are CuKα, 40 kV, and 40 mA, and with a concentration optical system using a primary detector where the divergence slit is 0.3°, the solar slit is 4.1°, the step width is 0.02°, the scan speed is 0.2 s/step, and the sample rotation speed is 15 rpm, measured is 2θ=10-70°. Further, the height (level) of peak detected at a predetermined angle is defined as peak intensity, and the peak intensity $I_1$ of a (111) plane detected in 2θ=28.44° of silicon, the peak intensity $I_2$ of a (110) plane detected in 2θ=10.48° of cordierite, and the peak intensity $I_3$ of a (120) plane detected in 2θ=26.27° of mullite are obtained by using the above-described X-ray diffraction apparatus. Furthermore, whether the amorphous phase is present or not is determined by whether there is halo or not in an X-ray diffraction pattern, and the constituent component is deposited by EDS (energy dispersive X-ray spectroscopic analysis). The method of determining whether the amorphous phase is present or not is not limited to the above-described method, but whether the amorphous phase is present or not can be also determined from, for example, whether there is halo or not in an electron diffraction pattern obtained by the transmission electron microscope (TEM) or the scanning transmission electron microscope (STEM).

The porosity, the pore diameter, and the bulk density in Table 3 are measured by the mercury press-in method (JIS R1655) using the mercury porosimeter, as described above. Further, the initial resistivity in Table 3 is volume resistivity measured by the four-terminal method (JIS C2525). The resistance change rate is obtained by the above-described method. Specifically, a specimen cut out from the partition wall 22 of the honeycomb structure 2 is exposed in the atmosphere at 950° C. for 50 hours, and then the volume resistivity of the specimen (hereinafter, also referred to as "post-exposure resistivity") is measured by the four-terminal method. Then, the resistance change rate refers to a result expressed by percentage, which is obtained by subtracting 1 from a value obtained by dividing the post-exposure resistivity by the initial resistivity.

In Example 1, as to the silicon raw material and the cordierite raw material which are main raw materials of the honeycomb structure 2, the particle diameter (D50) $d_1$ of the silicon raw material is 2.0 μm and the particle diameter (D50) $d_2$ of the cordierite raw material is 8.0 μm. Therefore, the particle diameter ratio $d_1/d_2$ is 0.25. Further, in the main raw material, the content percentage of the silicon raw material is 80.0 mass % and the content percentage of the cordierite raw material is 20.0 mass %. Furthermore, aluminum hydroxide, montmorillonite, and kaolin serving as the aids are not added.

The constituent phases of the honeycomb structure 2 in Example 1 are the silicon phase, the cordierite phase, the cristobalite phase, and amorphous silica. The peak ratio $I_1/(I_1+I_2)$ between silicon and cordierite is 0.95. Further, since the above-described constituent phase does not include the mullite phase, the peak ratio $I_3/(I_1+I_2+I_3)$ among mullite, silicon, and cordierite is not calculated. The porosity, the pore diameter, and the bulk density of the honeycomb structure 2 are 20.8%, 3.4 μm, and 1.87 g/cm³, respectively. Further, the initial resistivity of the honeycomb structure 2 is low, specifically 0.15 Ω·m, and the resistance change rate thereof is low, specifically 20%.

Figure 3:
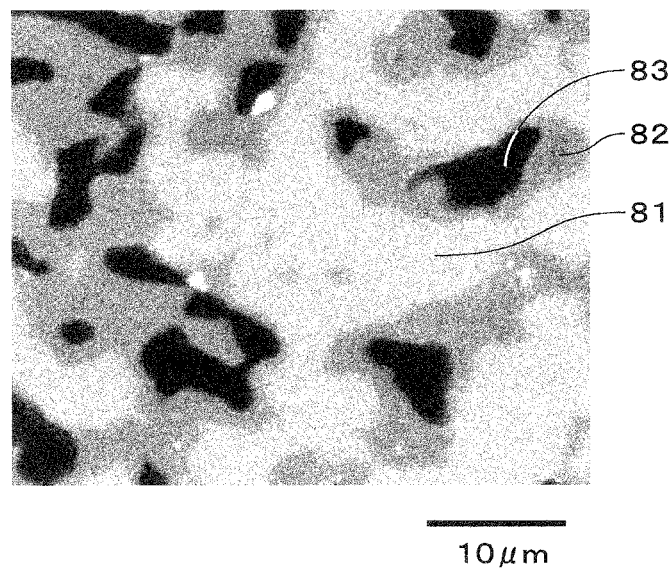
FIG. 3 is a SEM image of the honeycomb structure.

In Example 2, the manufacturing conditions of the honeycomb structure 2 are the same as those in Example 1 except that the content percentages of the silicon raw material and the cordierite raw material in the main raw material are changed to 65.0 mass % and 35.0 mass %, respectively. The constituent phases of the honeycomb structure 2 are the same as those in Example 1. FIG. 3 is a SEM (Scanning Electron Microscope) image showing a polished cross section of the honeycomb structure 2 in Example 2. In FIG. 3, a white portion 81 represents the silicon phase, a gray portion 82 around the white portion 81 represents the cordierite phase, and a black portion 83 represents a pore. The peak ratio $I_1/(I_1+I_2)$ between silicon and cordierite is 0.91. The porosity, the pore diameter, and the bulk density of the honeycomb structure 2 are 22.4%, 2.6 μm, and 1.85 g/cm³, respectively. Further, the initial resistivity of the honeycomb structure 2 is low, specifically 0.18 Ω·cm, and the resistance change rate thereof is low, specifically 24%.

In Example 3, the manufacturing conditions of the honeycomb structure 2 are the same as those in Example 1 except that the content percentages of the silicon raw material and the cordierite raw material in the main raw material are changed to 50.0 mass % and 50.0 mass %, respectively. The constituent phases of the honeycomb structure 2 are the same as those in Example 1. The peak ratio $I_1/(I_1+I_2)$ between silicon and cordierite is 0.84. The porosity, the pore diameter, and the bulk density of the honeycomb structure 2 are 24.3%, 1.9 μm, and 1.83 g/cm$^3$, respectively. Further, the initial resistivity of the honeycomb structure 2 is low, specifically 0.35 Ω·cm, and the resistance change rate thereof is low, specifically 40%.

In Comparative Example 1, the manufacturing conditions of the honeycomb structure are the same as those in Example 1 except that the content percentages of the silicon raw material and the cordierite raw material in the main raw material are changed to 40.0 mass % and 60.0 mass %, respectively. The constituent phases of the honeycomb structure are the same as those in Example 1. The peak ratio $I_1/(I_1+I_2)$ between silicon and cordierite is 0.77. The porosity, the pore diameter, and the bulk density of the honeycomb structure are 25.4%, 1.7 μm, and 1.81 g/cm$^3$, respectively. Further, the initial resistivity of the honeycomb structure is high, specifically 2.80 Ω·cm. The resistance change rate of the honeycomb structure is 51%.

In Example 4, the manufacturing conditions of the honeycomb structure 2 are the same as those in Example 2 except that the particle diameter $d_1$ of the silicon raw material in the main raw material is changed to 6.0 μm. The particle diameter ratio $d_1/d_2$ is 0.75. The constituent phases of the honeycomb structure 2 are the same as those in Example 2. The peak ratio $I_1/(I_1+I_2)$ between silicon and cordierite is 0.93. The porosity, the pore diameter, and the bulk density of the honeycomb structure 2 are 38.4%, 2.2 μm, and 1.47 g/cm$^3$, respectively. Further, the initial resistivity of the honeycomb structure 2 is low, specifically 0.34 Ω·cm, and the resistance change rate thereof is low, specifically 39%.

In Example 5, the manufacturing conditions of the honeycomb structure 2 are the same as those in Example 2 except that the particle diameter $d_1$ of the silicon raw material in the main raw material is changed to 10 μm. The particle diameter ratio $d_1/d_2$ is 1.25. The constituent phases of the honeycomb structure 2 are the same as those in Example 2. The peak ratio $I_1/(I_1+I_2)$ between silicon and cordierite is 0.92. The porosity, the pore diameter, and the bulk density of the honeycomb structure 2 are 39.8%, 2.6 μm, and 1.44 g/cm$^3$, respectively. Further, the initial resistivity of the honeycomb structure 2 is low, specifically 1.03 Ω·cm, and the resistance change rate thereof is low, specifically 63%.

In Example 6, the manufacturing conditions of the honeycomb structure 2 are the same as those in Example 2 except that the particle diameter $d_2$ of the cordierite raw material in the main raw material is changed to 15 μm. The particle diameter ratio $d_1/d_2$ is 0.13. The constituent phases of the honeycomb structure 2 are the same as those in Example 2. The peak ratio $I_1/(I_1+I_2)$ between silicon and cordierite is 0.89. The porosity, the pore diameter, and the bulk density of the honeycomb structure 2 are 24.0%, 2.9 μm, and 1.80 g/cm$^3$, respectively. Further, the initial resistivity of the honeycomb structure 2 is low, specifically 0.58 Ω·cm, and the resistance change rate thereof is low, specifically 30%.

In Example 7, the manufacturing conditions of the honeycomb structure 2 are the same as those in Example 2 except that the particle diameter $d_2$ of the cordierite raw material in the main raw material is changed to 20 μm. The particle diameter ratio $d_1/d_2$ is 0.10. The constituent phases of the honeycomb structure 2 are the same as those in Example 2. The peak ratio $I_1/(I_1+I_2)$ between silicon and cordierite is 0.89. The porosity, the pore diameter, and the bulk density of the honeycomb structure 2 are 25.1%, 3.0 μm, and 1.78 g/cm$^3$, respectively. Further, the initial resistivity of the honeycomb structure 2 is low, specifically 0.65 Ω·cm, and the resistance change rate thereof is low, specifically 34%.

In Example 8, the manufacturing conditions of the honeycomb structure 2 are the same as those in Example 2 except that the particle diameter $d_2$ of the cordierite raw material in the main raw material is changed to 30 μm. The particle diameter ratio $d_1/d_2$ is 0.07. The constituent phases of the honeycomb structure 2 are the same as those in Example 2. The peak ratio $I_1/(I_1+I_2)$ between silicon and cordierite is 0.90. The porosity, the pore diameter, and the bulk density of the honeycomb structure 2 are 26.0%, 3.1 μm, and 1.76 g/cm$^3$, respectively. Further, the initial resistivity of the honeycomb structure 2 is low, specifically 0.86 Ω·cm, and the resistance change rate thereof is low, specifically 38%.

In Example 9, the manufacturing conditions of the honeycomb structure 2 are the same as those in Example 2 except that aluminum hydroxide, montmorillonite, and kaolin are added as the aids in the manufacture of the honeycomb structure 2. Aluminum hydroxide, montmorillonite, and kaolin are added by 1.1 parts by mass, 1.1 parts by mass, and 0.7 parts by mass, respectively, with respect to 100 parts by mass of the main raw material (i.e., the silicon raw material and the cordierite raw material). The constituent phases of the honeycomb structure 2 includes the mullite phase additionally to the silicon phase, the cordierite phase, the cristobalite phase, and the amorphous phase. The peak ratio $I_1/(I_1+I_2)$ between silicon and cordierite is 0.90. The peak ratio $I_3/(I_1+I_2+I_3)$ among mullite, silicon, and cordierite is 0.0011. The porosity, the pore diameter, and the bulk density of the honeycomb structure 2 are 18.7%, 1.9 μm, and 1.92 g/cm$^3$, respectively. Further, the initial resistivity of the honeycomb structure 2 is low, specifically 0.15 Ω·cm, and the resistance change rate thereof is low, specifically 2.7%.

In Example 10, the manufacturing conditions of the honeycomb structure 2 are the same as those in Example 9 except that the addition amount of aid is changed. Aluminum hydroxide, montmorillonite, and kaolin are added by 2.2 parts by mass, 2.2 parts by mass, and 1.4 parts by mass, respectively, with respect to 100 parts by mass of the main raw material (i.e., the silicon raw material and the cordierite raw material). The constituent phases of the honeycomb structure 2 are the same as those in Example 9. The peak ratio $I_1/(I_1+I_2)$ between silicon and cordierite is 0.90. The peak ratio $I_3/(I_1+I_2+I_3)$ among mullite, silicon, and cordierite is 0.0023. The porosity, the pore diameter, and the bulk density of the honeycomb structure 2 are 17.6%, 1.7 μm, and 1.97 g/cm$^3$, respectively. Further, the initial resistivity of the honeycomb structure 2 is low, specifically 0.15 Ω·cm, and the resistance change rate thereof is low, specifically 2.3%.

In Example 11, the manufacturing conditions of the honeycomb structure 2 are the same as those in Example 9 except that the addition amount of aid is changed. Aluminum hydroxide, montmorillonite, and kaolin are added by 4.4 parts by mass, 4.4 parts by mass, and 2.8 parts by mass, respectively, with respect to 100 parts by mass of the main raw material (i.e., the silicon raw material and the cordierite raw material). The constituent phases of the honeycomb structure 2 are the same as those in Example 9. The peak ratio $I_1/(I_1+I_2)$ between silicon and cordierite is 0.89. The peak ratio $I_3/(I_1+I_2+I_3)$ among mullite, silicon, and cordierite is 0.0053. The porosity, the pore diameter, and the bulk density of the honeycomb structure 2 are 15.3%, 1.2 μm, and 2.06 g/cm³, respectively. Further, the initial resistivity of the honeycomb structure 2 is low, specifically 0.14 Ω·cm, and the resistance change rate thereof is low, specifically 2.1%.

As described above, in Examples 1 to 3 and Comparative Example 1, the respective content percentages of the silicon raw material and the cordierite raw material in the main raw material are changed. As a result, in Comparative Example 1 where the content percentage of the silicon raw material in the main raw material is 40 mass %, the initial resistivity is high, specifically 2.80 Ω·cm (higher than 2.50 Ω·cm) while in Examples 1 to 3 where the content percentage ranges from 50 mass % to 80 mass %, the initial resistivity is low, specifically in a range from 0.15 Ω·cm to 0.35 Ω·cm. Further, the resistance change rate in Examples 1 to 3 ranges from 20% to 40%, which is lower than the resistance change rate (51%) in Comparative Example 1. Therefore, in terms of reducing the initial resistivity to 2.5 Ω·cm or lower, it is preferable that the content percentage of the silicon raw material in the main raw material should be higher than 40 mass % and more preferable that the content percentage should be not lower than 50 mass %.

Further, with attention paid to Examples 1 to 3, in Example 3 where the content percentage of the silicon raw material in the main raw material is 50 mass %, the initial resistivity is 0.35 Ω·cm while in Examples 1 and 2 where the content percentage ranges from 65 mass % to 80 mass %, the initial resistivity is lower, specifically in a range from 0.15 Ω·cm to 0.18 Ω·cm. Furthermore, the resistance change rate in Example 3 is 40% while the resistance change rate in Examples 1 and 2 is lower, specifically in a range from 20% to 24%.

Therefore, in terms of further reducing the initial resistivity (for example, to 0.20 Ω·cm or lower), it is preferable that the content percentage of the silicon raw material in the main raw material should be higher than 50 mass % and more preferable that the content percentage should be not lower than 65 mass %. Further, also in terms of further reducing the resistance change rate (for example, to 25% or lower), it is preferable that the content percentage of the silicon raw material in the main raw material should be higher than 50 mass % and more preferable that the content percentage should be not lower than 65 mass %.

As described above, in Examples 2, 4, and 5, the particle diameter $d_1$ of the silicon raw material is changed within a range from 2.0 μm to 10 μm, and the particle diameter ratio $d_1/d_2$ is changed within a range from 0.25 to 1.25. As a result, in Example 5 where the particle diameter ratio $d_1/d_2$ is 1.25, the initial resistivity is 1.03 Ω·cm while in Examples 2 and 4 where the particle diameter ratio $d_1/d_2$ ranges from 0.25 to 0.75, the initial resistivity is lower, specifically in a range from 0.18 Ω·cm to 0.34 Ω·cm. Further, the resistance change rate in Examples 2 and 4 ranges from 24% to 39%, which is lower than the resistance change rate (63%) in Example 5.

Therefore, in terms of further reducing the initial resistivity (for example, to 0.50 Ω·cm or lower), it is preferable that the particle diameter ratio $d_1/d_2$ should be lower than 1.25 and more preferable that the particle diameter ratio $d_1/d_2$ should be not higher than 0.75. Further, also in terms of further reducing the resistance change rate (for example, to 50% or lower), it is preferable that the particle diameter ratio $d_1/d_2$ should be lower than 1.25 and more preferable that the particle diameter ratio $d_1/d_2$ should be not higher than 0.75.

As described above, in Examples 2 and 6 to 8, the particle diameter $d_2$ of the cordierite raw material is changed within a range from 8.0 μm to 30 μm, and the particle diameter ratio $d_1/d_2$ is changed within a range from 0.07 to 0.25. As a result, in Example 8 where the particle diameter ratio $d_1/d_2$ is 0.07, the initial resistivity is 0.86 Ω·cm while in Examples 2, 6, and 7 where the particle diameter ratio $d_1/d_2$ ranges from 0.10 to 0.25, the initial resistivity is lower, specifically in a range from 0.18 Ω·cm to 0.65 Ω·cm. Further, the resistance change rate in Examples 2, 6, and 7 ranges from 24% to 34%, which is lower than the resistance change rate (38%) in Example 8.

Therefore, in terms of further reducing the initial resistivity (for example, to 0.75Ω·cm or lower), it is preferable that the particle diameter ratio $d_1/d_2$ should be higher than 0.07 and more preferable that the particle diameter ratio $d_1/d_2$ should be not lower than 0.10. Further, also in terms of further reducing the resistance change rate (for example, to 35% or lower), it is preferable that the particle diameter ratio $d_1/d_2$ should be higher than 0.07 and more preferable that the particle diameter ratio $d_1/d_2$ should be not lower than 0.10. Further, in terms of much further reducing the initial resistivity (for example, to 0.50 Ω·cm or lower), it is preferable that the particle diameter ratio $d_1/d_2$ should be higher than 0.13 and more preferable that the particle diameter ratio $d_1/d_2$ should be not lower than 0.25. Further, also in terms of much further reducing the resistance change rate (for example, to 25% or lower), it is preferable that the particle diameter ratio $d_1/d_2$ should be higher than 0.13 and more preferable that the particle diameter ratio $d_1/d_2$ should be not lower than 0.25.

As described above, in Examples 2 and 9 to 11, whether aluminum hydroxide, montmorillonite, and kaolin are added or not is different. In Example 2 where aluminum hydroxide, montmorillonite, and kaolin are not added, no mullite phase is generated and the initial resistivity is 0.18 Ω·cm while in Examples 9 to 11 where aluminum hydroxide, montmorillonite, and kaolin are added, the mullite phase is generated and the initial resistivity is lower, specifically in a range from 0.14 Ω·cm to 0.15 Ω·cm. Further, the resistance change rate in Examples 9 to 11 ranges from 2.1% to 2.7%, which is lower than the resistance change rate (24%) in Example 2. Further, in Examples 9 to 11, the porosity and the pore diameter are lower than those in Example 2 and the bulk density is higher than that in Example 2. In other words, in Examples 9 to 11, the denseness of the honeycomb structure 2 is increased, as compared with that in Example 2.

Therefore, in terms of further reducing the initial resistivity (for example, to 0.15 Ω·cm or lower), it is preferable that the aids such as aluminum hydroxide, montmorillonite, kaolin, and the like should be added and the mullite phase should be generated. Further, also in terms of further reducing the resistance change rate (for example, to 5% or lower), it is preferable that the aids such as aluminum hydroxide, montmorillonite, kaolin, and the like should be added and the mullite phase should be generated. Furthermore, in terms of increasing the bulk density and increasing the denseness (for example, increasing the bulk density to 2.00 g/cm³ or higher), it is more preferable that the addition amounts of aluminum hydroxide, montmorillonite, and kaolin are 4.4 parts by mass or higher, 4.4 parts by mass or higher, and 2.8 parts by mass or higher, respectively, with respect to 100 parts by mass of the main raw material (i.e., the silicon raw material and the cordierite raw material).

As described above, the composite sintered body contains a silicon phase which is a main phase, a cordierite phase, and an amorphous phase containing Si. Further, the volume resistivity (the initial resistivity in the above-described example) of the composite sintered body at a room temperature is not lower than 0.1 Ω·m and not higher than 2.5 Ω·cm. In the composite sintered body, the amorphous phase coats the silicon particles of the silicon phase, and the conductive path formed of the silicon particles is protected from the oxidation atmosphere. Even when the composite sintered body is exposed to the high temperature oxidation atmosphere, oxidation of the silicon particles is thereby suppressed and a change in the volume resistivity of the composite sintered body is suppressed. Therefore, it is possible to provide a composite sintered body having low resistance and high oxidation resistance (in other words, in which the resistance change rate is low after the exposure to the high temperature oxidation atmosphere). Further, even when a relatively high voltage is applied to the composite sintered body, it is possible to prevent the electric circuit from being damaged due to excessive current flow.

As described above, in the composite sintered body, it is preferable that $I_1/(I_1+I_2)$ should be not smaller than 0.80 and not larger than 0.97. In the above formula, $I_1$ and $I_2$ represent peak intensities of the (111) plane of silicon and the (110) plane of cordierite, respectively, which are obtained by the X-ray diffraction method. The conductive path is thereby suitably formed of the silicon particles, to reduce the volume resistivity, and the thermal expansion coefficient of the composite sintered body is reduced by cordierite having a relatively low thermal expansion coefficient and the thermal shock resistance thereof is increased. In other words, it is possible to make the low resistance and the thermal shock resistance of the composite sintered body suitably compatible with each other.

It is preferable that the composite sintered body should further contain a mullite phase. As described above, the mullite phase is generated by consuming the cristobalite phase which is likely to be inevitably generated in the manufacture of the composite sintered body, and the denseness of the composite sintered body is increased. As a result, it is possible to increase the oxidation resistance and the strength of the composite sintered body. Further, since the cristobalite phase having a relatively high thermal expansion coefficient is reduced, it is possible to reduce the thermal expansion coefficient of the composite sintered body, and consequently possible to increase the thermal shock resistance of the composite sintered body.

As described above, in the composite sintered body, it is preferable that $I_3/(I_1+I_2+I_3)$ should be not smaller than 0.001 and not larger than 0.006. In the above formula, $I_1$, $I_2$, and $I_3$ represent the peak intensities of a (111) plane of silicon, a (110) plane of cordierite, and a (120) plane of mullite, respectively, which are obtained by the X-ray diffraction method. As shown in Examples 9 to 11, it is thereby possible to suitably increase the oxidation resistance, the strength, and the thermal shock resistance of the composite sintered body.

As described above, it is preferable that the porosity of the composite sintered body should be not lower than 15% and not higher than 40%. The Young's modulus of the composite sintered body is thereby reduced and the thermal shock resistance thereof is increased. Further, it is possible to suitably reduce the volume resistivity of the composite sintered body and suitably increase the oxidation resistance and the strength thereof.

As described above, it is preferable that the pore diameter of the composite sintered body should be not smaller than 1.0 μm and not larger than 3.5 μm. It is thereby possible to suitably reduce the volume resistivity of the composite sintered body and suitably increase the oxidation resistance and the strength thereof.

As described above, it is preferable that the bulk density of the composite sintered body should be not lower than 1.4 g/cm³ and not higher than 2.2 g/cm³. It is thereby possible to suitably reduce the volume resistivity of the composite sintered body and suitably increase the oxidation resistance and the strength thereof. Further, the heat capacity of the composite sintered body is suitably reduced and the temperature thereof becomes easier to rise.

As described above, in the composite sintered body, it is preferable that the change rate of the volume resistivity after exposing the composite sintered body to an atmosphere at 950° C. for 50 hours should be not higher than 100%. It is thereby possible to provide a composite sintered body having higher oxidation resistance.

The above-described honeycomb structure 2 includes the cylindrical outer wall 21 and the partition wall 22. The partition wall 22 partitions the inside of the cylindrical outer wall 21 into the plurality of cells 23. The cylindrical outer wall 21 and the partition wall 22 are formed, including the above-described composite sintered body. It is thereby possible to achieve the honeycomb structure 2 having low resistance and high oxidation resistance. Further, when the composite sintered body does not contain borosilicate, it is possible to reduce the sintering shrinkage in the manufacture and manufacture the honeycomb structure 2 with high dimensional accuracy.

The above-described electrically heated catalyst 1 is used to perform the purification treatment of exhaust gas discharged from an engine. The electrically heated catalyst 1 includes the above-described honeycomb structure 2 and the pair of electrode parts 41 fixed to the outer surface of the honeycomb structure 2, for giving a current to the honeycomb structure 2. Since the honeycomb structure 2 has low resistance as described above, the temperature of the electrically heated catalyst 1 can be quickly increased. Further, since the honeycomb structure 2 has high oxidation resistance, it is possible to perform the purification treatment of exhaust gas by using the electrically heated catalyst 1 with high efficiency for long time period.

The above-described method of manufacturing a composite sintered body includes a step (Steps S11 to S12) of obtaining a sintered body by molding and sintering (firing) raw material powder containing a silicon raw material and a cordierite raw material and a step (Step S13) of obtaining a composite sintered body by performing an oxidation treatment on the sintered body. The composite sintered body contains a silicon phase which is a main phase, a cordierite phase, and an amorphous phase containing Si. The volume resistivity of the composite sintered body at a room temperature is not lower than 0.1 Ω·cm and not higher than 2.5 Ω·cm. It is thereby possible to provide a composite sintered body having low resistance and high oxidation resistance, as described above.

In the method of manufacturing the composite sintered body, as described above, when $d_1$ and $d_2$ represent particle diameters of a silicon raw material and a cordierite raw material, respectively, it is preferable that $d_1/d_2$ should be not smaller than 0.25 and not larger than 1.25. It is thereby possible to suitably reduce the volume resistivity of the composite sintered body.

In the composite sintered body, the honeycomb structure 2, and the electrically heated catalyst 1 which are described above, various modifications can be made.

For example, in the above-described composite sintered body, the bulk density may be lower than 1.4 g/cm³ or may be higher than 2.2 g/cm³. Further, the porosity may be lower than 15% or may be higher than 40%. The pore diameter may be smaller than 1.0 μm or may be larger than 3.5 μm.

In the above-described composite sintered body, the resistance change rate (i.e., the change rate of the volume resistivity after exposing the composite sintered body to the atmosphere at 950° C. for 50 hours) may be higher than 100% or may be lower than −50%.

In the above-described composite sintered body, the peak ratio $I_1/(I_1+I_2)$ between silicon and cordierite may be smaller than 0.80 or may be larger than 0.97. Further, the peak ratio $I_3/(I_1+I_2+I_3)$ among mullite, silicon, and cordierite may be smaller than 0.001 or may be larger than 0.006. The aid used for generating the mullite phase is not limited to the above-described aluminum hydroxide, montmorillonite, and kaolin, but may be changed in various manners. Further, the composite sintered body may not contain the mullite phase. Furthermore, the composite sintered body may not contain the cristobalite phase.

In the above-described composite sintered body, only if the amorphous phase contains Si, the amorphous phase does not necessarily need to contain amorphous silica.

In the above-described method of manufacturing the composite sintered body, the particle diameter ratio $d_1/d_2$ between the silicon raw material and the cordierite raw material may be lower than 0.25 or may be higher than 1.25. Further, the composite sintered body may be manufactured by any method other than the above.

In the electrically heated catalyst 1, the outer shape of the honeycomb structure 2 is not limited to the substantially columnar shape but may be changed into any one of various shapes. Further, the respective numbers of and the arrangement of the electrode layers 31 and the electrode parts 41 may be variously changed. Furthermore, in the electrically heated catalyst 1, the electrode layer 31 may be omitted and the electrode part 41 may be directly fixed to the honeycomb structure 2.

The honeycomb structure 2 may be used for any use (e.g., a ceramic heater) other than the electrically heated catalyst.

The above-described composite sintered body may be used for any structure other than the honeycomb structure 2. For example, a structure having any one of various shapes, such as a substantially cylindrical shape, a substantially flat plate-like shape, or the like, may be formed, including the composite sintered body.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The present invention can be used for the electrically heated catalyst or the like which is used for the purification treatment of exhaust gas from an engine of an automobile or the like.

REFERENCE SIGNS LIST

1 Electrically heated catalyst
2 Honeycomb structure
21 Cylindrical outer wall
22 Partition wall
41 Electrode part
S11 to S13 Step

The invention claimed is:

1. A composite sintered body, containing:
a silicon phase which is a main phase;
a cordierite phase; and
an amorphous phase containing Si,
wherein the volume resistivity thereof at a room temperature is not lower than 0.1 Ω·cm and not higher than 2.5 Ω·cm, and
wherein $I_1/(I_1+I_2)$ is not smaller than 0.80 and not larger than 0.97, wherein in the above formula, $I_1$ and $I_2$ represent peak intensities of a (111) plane of silicon and a (110) plane of cordierite, respectively, which are obtained by the X-ray diffraction method.

2. The composite sintered body according to claim 1, further containing:
a mullite phase.

3. The composite sintered body according to claim 2, wherein
$I_3/(I_1+I_2+I_3)$ is not smaller than 0.001 and not larger than 0.006,
wherein in the above formula, $I_1$, $I_2$, and $I_3$ represent peak intensities of a (111) plane of silicon, a (110) plane of cordierite, and a (120) plane of mullite, respectively, which are obtained by the X-ray diffraction method.

4. The composite sintered body according to claim 1, wherein
the porosity is not lower than 15% and not higher than 40%.

5. The composite sintered body according to claim 1, wherein
the pore diameter is not smaller than 1.0 μm and not larger than 3.5 μm.

6. The composite sintered body according to claim 1, wherein
the bulk density is not lower than 1.4 g/cm³ and not higher than 2.2 g/cm³.

7. The composite sintered body according to claim 1, wherein
the change rate of the volume resistivity thereof after exposing the composite sintered body to an atmosphere at 950° C. for 50 hours is not higher than 100%.

8. A honeycomb structure, comprising:
a cylindrical outer wall; and
a partition wall partitioning the inside of said cylindrical outer wall into a plurality of cells,
wherein said cylindrical outer wall and said partition wall are formed,
including said composite sintered body according to claim 1.

9. An electrically heated catalyst used for performing a purification treatment of exhaust gas discharged from an engine, comprising:
said honeycomb structure according to claim 8, and
a pair of electrode parts fixed to an outer surface of said honeycomb structure, for giving a current to said honeycomb structure.

10. A method of manufacturing a composite sintered body, comprising:
obtaining a sintered body by molding and sintering raw material powder containing a silicon raw material and a cordierite raw material; and
obtaining a composite sintered body by performing an oxidation treatment on said sintered body, wherein said composite sintered body contains
a silicon phase which is a main phase;
a cordierite phase; and
an amorphous phase containing Si,
wherein the volume resistivity thereof at a room temperature is not lower than 0.1 Ω·cm and not higher than 2.5 Ω·cm, and
wherein $I_1/(I_1+I_2)$ is not smaller than 0.80 and not larger than 0.97, wherein in the above formula, $I_1$ and $I_2$ represent peak intensities of a (111) plane of silicon and a (110) plane of cordierite, respectively, which are obtained by the X-ray diffraction method.

11. The method of manufacturing a composite sintered body according to claim 10, wherein
when $d_1$ and $d_2$ represent particle diameters of said silicon raw material and said cordierite raw material, respectively, $d_1/d_2$ is not smaller than 0.25 and not larger than 1.25.

* * * * *